Figure 1:
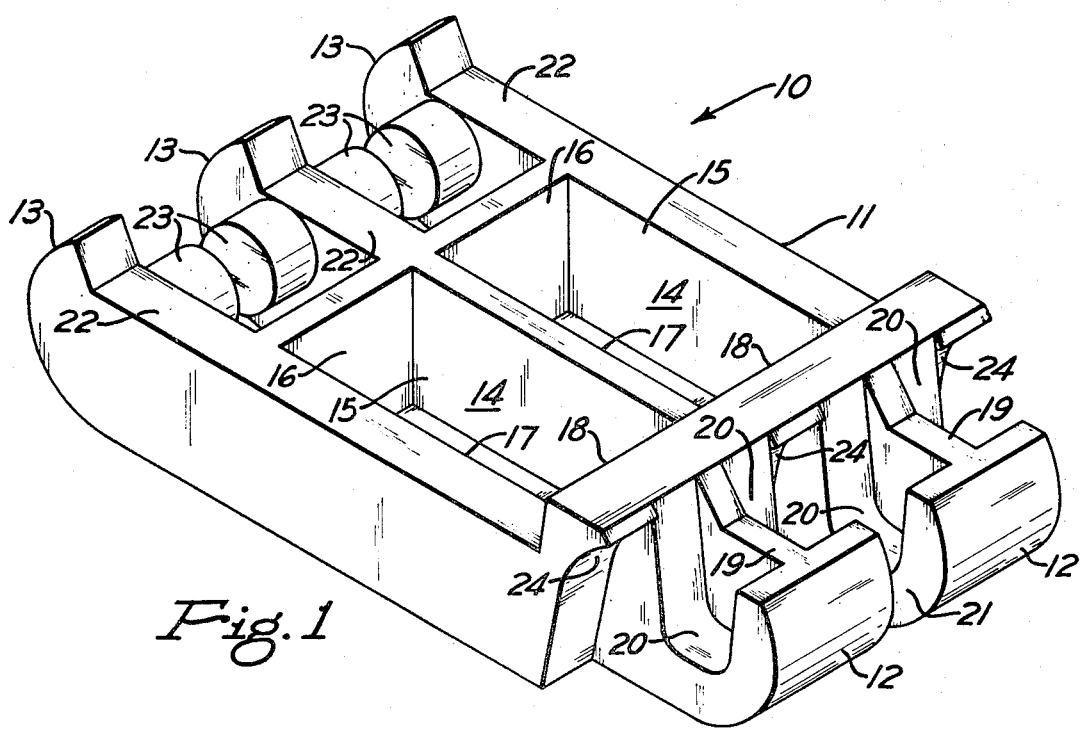

United States Patent

[11] 3,628,834

[72] Inventor  Howard A. Anderson
               Pittsburgh, Pa.
[21] Appl. No. 855,009
[22] Filed     Sept. 3, 1969
[45] Patented  Dec. 21, 1971
[73] Assignee  Baychem Corporation
               New York, N.Y.

[54] LINK MEMBERS AND ENDLESS CHAINS ESPECIALLY FOR TRACKED VEHICLES
6 Claims, 7 Drawing Figs.
[52] U.S. Cl. .................................................. 305/35 R,
                                                74/249, 198/189
[51] Int. Cl. ........................................................ B62d 55/28
[50] Field of Search ........................................ 305/35, 50;
       74/249, 250, 245, 252, 251, 251 C; 198/189, 193

[56]            References Cited
            UNITED STATES PATENTS
1,450,471  4/1923  Wickersham ................. 305/50
2,312,071  2/1943  Broadwater ................... 180/5
2,695,095  11/1954 Anderson ...................... 198/189
2,917,347  12/1959 Reuter .......................... 305/38
3,231,069  1/1966  Lanham ........................ 198/189

Primary Examiner—Richard J. Johnson
Attorneys—Robert A. Gerlach and George W. Rauchfuss, Jr.

ABSTRACT: One-piece molded plastic link members which are easily assembled and disassembled into endless chains or treads of easily replaceable link members and in which disassembly can occur only at a time that adjacent linked members are placed in a relationship not occurring during normal operation of the endless chain or tread is disclosed. The one-piece molded link members of this invention are particularly suitable and adaptable for forming endless chains or treads to be used on tracked vehicles such as snowmobiles or the like. The molded link members are characterized by being adapted for coupling with an identical link member without distortion of either member by engaging a male portion of one link member in an oppositely placed female portion of an adjoining link member.

INVENTOR.
HOWARD A. ANDERSON
BY
ATTORNEYS.

LINK MEMBERS AND ENDLESS CHAINS ESPECIALLY FOR TRACKED VEHICLES

This invention relates to a link chain construction. More particularly, this invention relates to link chain members which are adapted to be connected to other identical link members to form endless chains or treads or the like.

It has been heretofore known that conveyor-type chain links could be constructed as integral lengths comprising a body portion, a tongue portion and a clevis portion. In order to form chains of sufficient length it was necessary to utilize a separate pin to connect the tongue of one link between the clevis of an adjacent link. This necessitated the drilling of holes by expensive machining and costly assembly operations. In such an arrangement the pins employed were subject to wear and failure while in use thereby interrupting their serviceability. Such links have generally been formed of metals. Moreover, in certain other applications such as, for example, in the formation of endless tracks or belts for tracked vehicles such as snowmobiles and the like such metal link members are entirely unsuitable due to extreme abrasion. Thus, in such tracked vehicles it has long been customary heretofore to employ a unitary endless flexible belt of rubber and fabric. Such unitary belts have not proven entirely satisfactory since wear in the belt necessitates complete replacement of the belt which is both costly and time consuming. Furthermore, such unitary belts do not permit adjustment of the belt to a different desired length.

It is, therefore, an object of this invention to provide a link member and an endless chain or tread which is devoid of the foregoing deficiencies or problems. A further object of this invention is to provide a new and improved link member that can be produced without machining or drilling and requires only simple and easy construction. An additional object of this invention is to provide link members of good relative strength per unit weight. Yet another object is to provide new and improved endless chains or treads of multiple link members which are easily assembled and disassembled from a minimum number of components. A still further object of this invention is to provide endless chains or treads composed of easily replaceable link members. A still further additional object of this invention is to provide endless chains or treads of easily replaceable link members such that the endless chain or tread is of an easily adjustable length. It is yet another object of this invention to provide link members for producing endless chains or treads in which disassembly can occur only at the time that adjacent link members are placed in a relationship not occurring during normal operation of the chain or tread. Another object of this invention is to provide a chain or tread of molded plastic link members where unintentional disengagement of the link members is prevented. A still further additional object of this invention is to provide link members and endless chains or treads from a plurality of said link members wherein said endless chains are particularly suitable and adaptable as endless chains or treads on tracked vehicles such as snowmobiles and the like. Another object of this invention is to provide link members of particular desirable properties for use in forming endless chains or tracks for use on vehicles such as snowmobiles and the like.

Figure 3:
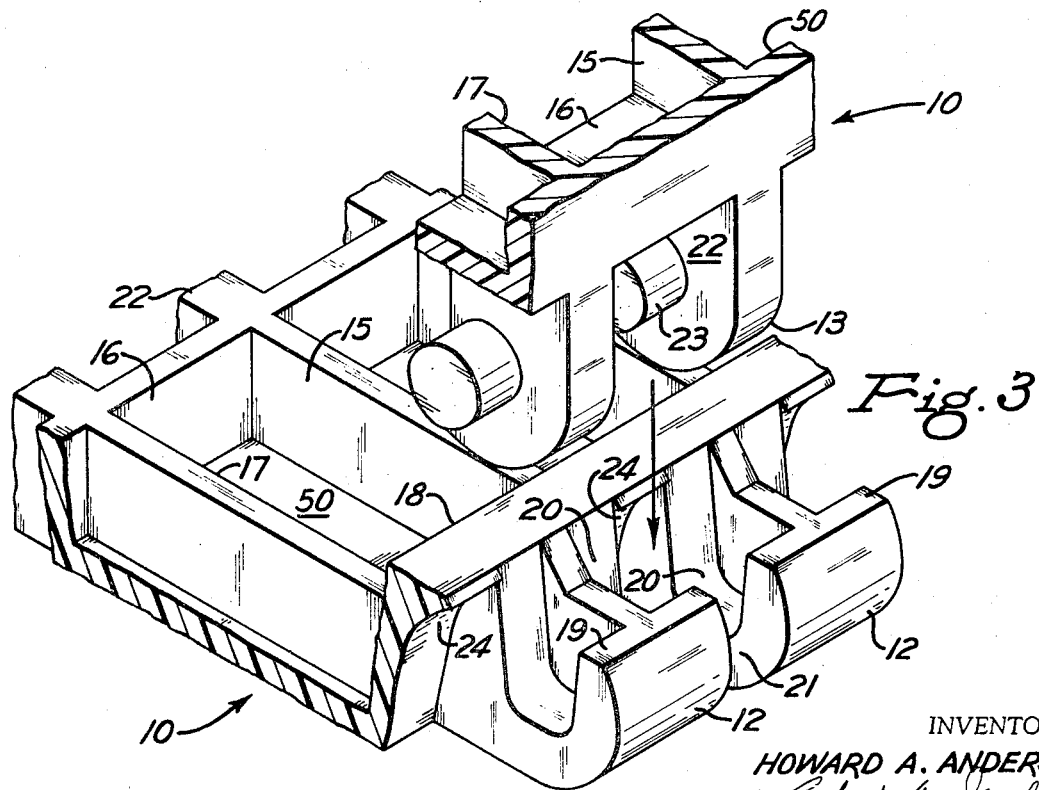
Figure 2:
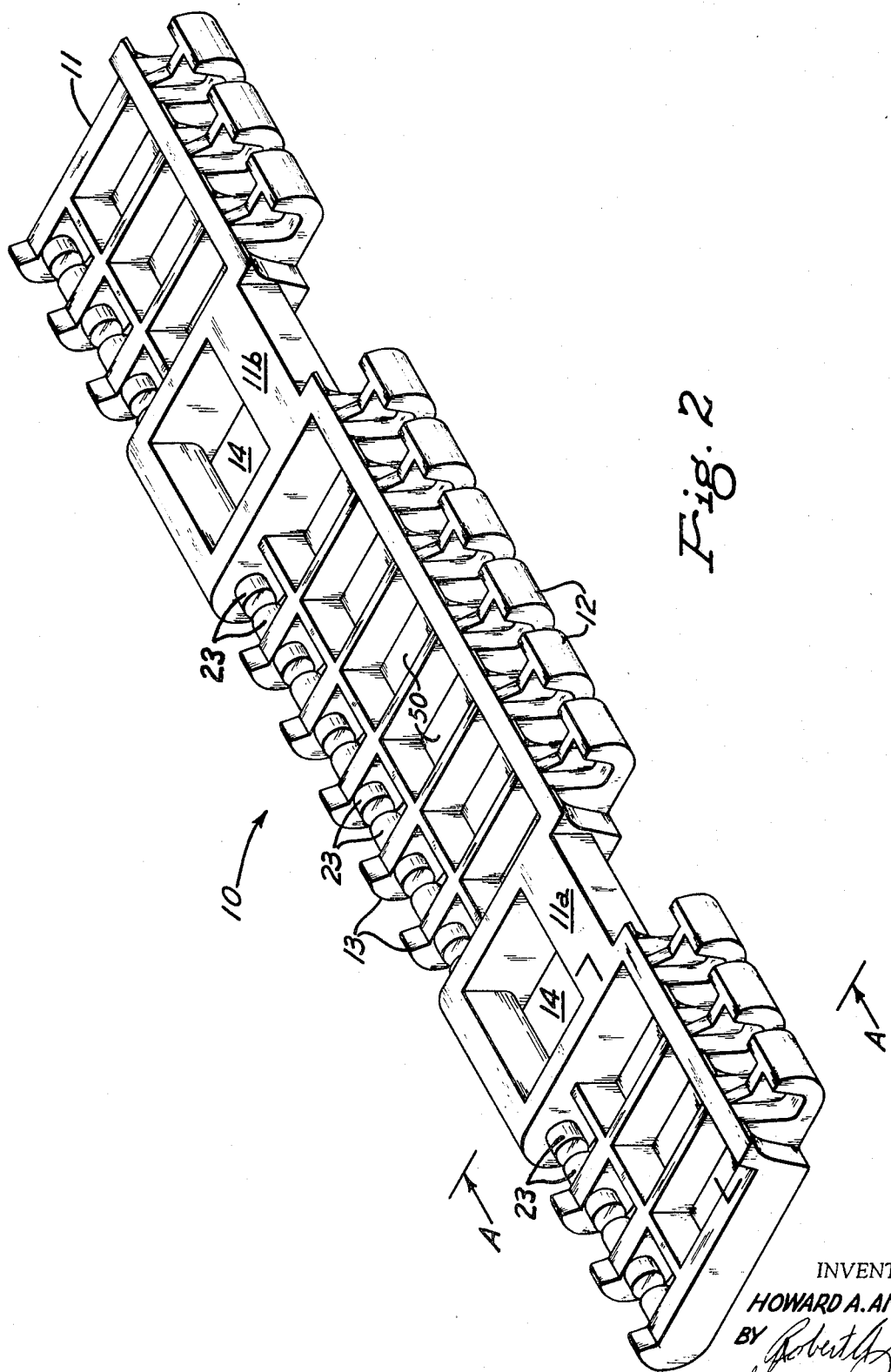
Figure 4:
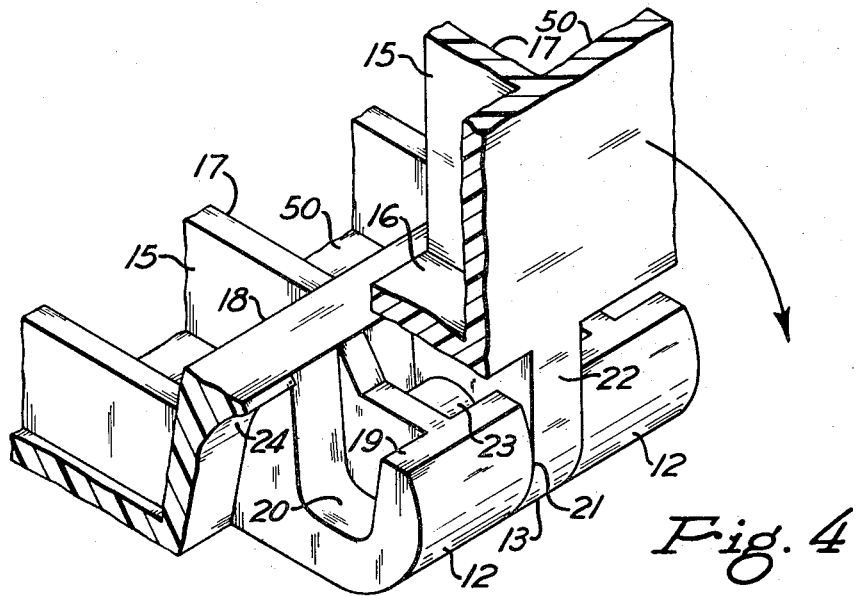
Figure 5:
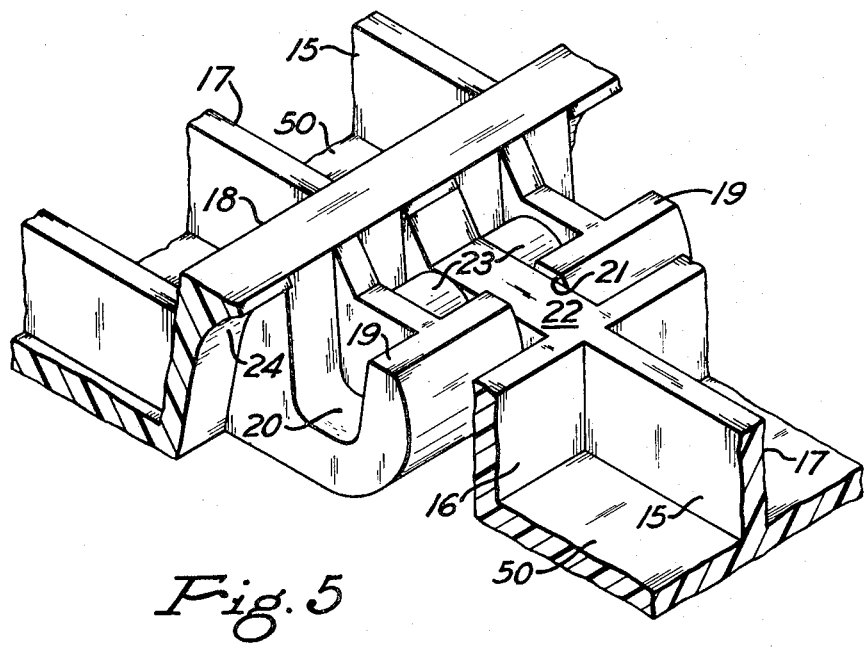
Figure 6:
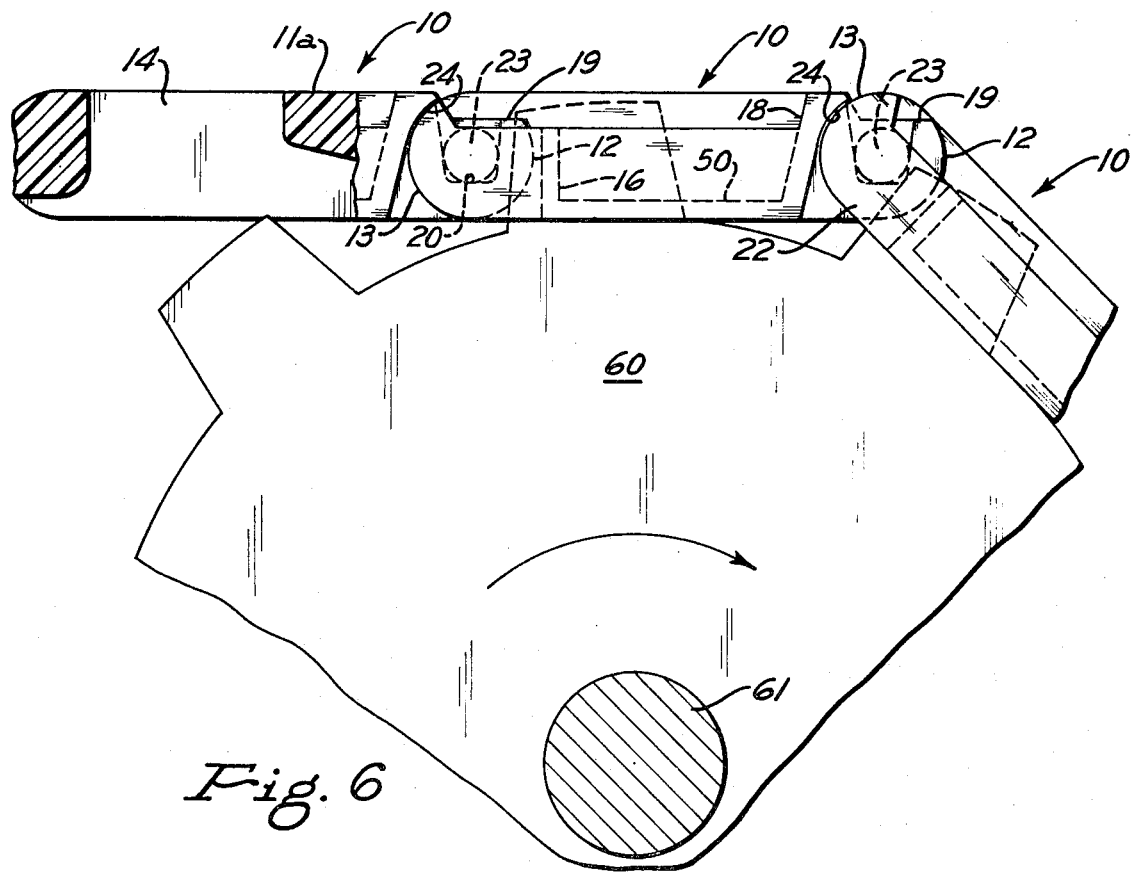
Figure 7:
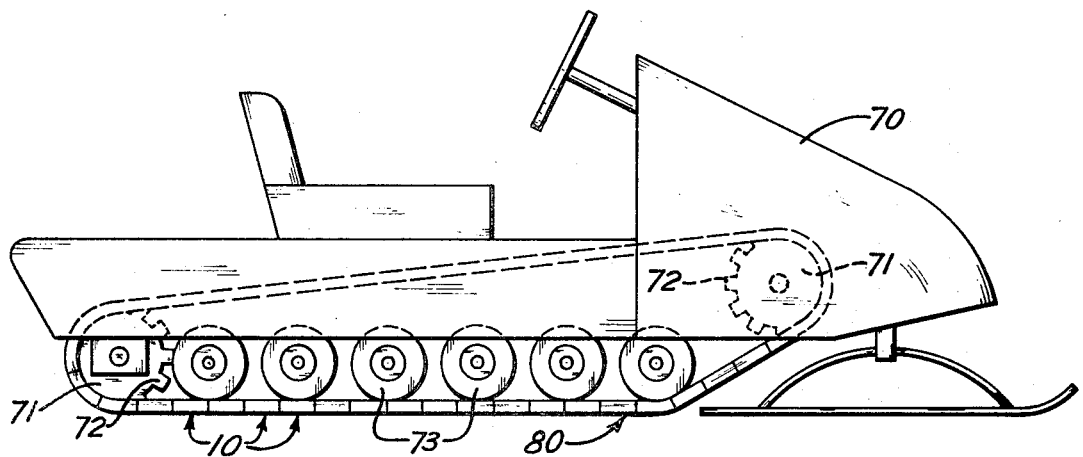

The foregoing objects and others which become apparent from the following description and accompanying drawings in which:

FIG. 1 is a perspective view of a link member of the invention,

FIG. 2 is a perspective view of another embodiment of a link member of the invention, FIGS. 3, 4 and 5 are partial perspective views showing an assembly of link members of the invention of the type of FIG. 2 into an endless chain, FIG. 6 is an elevation view, partially in section along line A—A of FIG. 2, of an endless chain of the invention in operation on a sprocket wheel, and FIG. 7 is a perspective view partially in section of a snowmobile having an endless chain track formed of link members of the invention. This invention, generally speaking is accomplished by providing a one-piece molded plastic link member adapted for coupling with another identical link member without distortion of either member, which link member comprises a one-piece body portion having a recessed opening defined by integral walls and adapted to receive the teeth of a driving means, the body portion having a female portion extending from one end thereof and a male portion extending from the opposite end thereof, the integral female portion being adapted to receive an integral male portion of an identical link member when the male portion of an identical link is axially aligned with the female portion. Thus, the invention contemplates endless chains or treads particularly adapted for use on tracked vehicles wherein a plurality of said link members are releasably interconnected in cooperative relationship to form a continuous chain or tread.

Referring more particularly to the drawings wherein the same reference character or numeral refers to like or corresponding parts throughout the several views, FIG. 1 illustrates a link member constructed in accordance with the principles of this invention as a one-piece molded plastic link member 10 comprising three major portions, a body portion 11, a female portion 12 and a male portion 13. The link member 10 is adapted to be molded of any suitable thermoplastic resin, and more particularly, an abrasion-resistant thermoplastic resin when designed for use in tracked vehicles, in a manner well known to those skilled in the art. In the embodiment shown in FIG. 1 the body portion 11 is provided with a recessed opening 14 defined by integral walls 15, 16, 17 and 18 extending from side to side of the link, said recessed opening 14 being adapted to receive the teeth of a driving means, such as, for example, sprocket teeth. A female portion 12 is formed integral with one end of the body portion and is formed by a tongue member 19 extending in a curved path from one end of the body portion 11. The curved path of tongue member 19 facilitates rotation of adjacent joined links as later described. Tongue member 19 is slotted from the top on both sides to provide a recess 20 for a purpose to be explained. In the practice of this invention the link members can be one-piece molded plastic links having any multiple number of such female members 12, and male members 13, particularly as shown in the preferred embodiment illustrated in FIG. 2. For ease of illustration, however, the invention will be described by reference to an embodiment as shown in FIG. 1 where a link member having a minimum number of male and female portions is illustrated. Adjacent female portions 12 thus define a male receiving recess 21 by means of adjacent, spaced-apart and slotted tongue members 19 extending from one end of the body portion 11. For purposes of clarity and orientation "forward" when used herein shall refer to the relative direction of the female portion 12 and "rearward" shall refer to the relative direction of the male portion 13.

A male portion 13 is formed integral with the opposite, rearward end of the body portion 11 and is formed by an integral finger extension 22 having on the sidewalls thereof a transverse pin extension 23 of generally circular cross section. Each finger extension 22 extending from body portion 11 terminates in a curved section and is provided with transverse pin extensions on each sidewall of the finger extensions 22 except for the two terminal finger extensions 22 at each edge of body portion 11. The terminal finger extensions 22 are provided with transverse pin extensions 23 only at the inner sidewall of the finger extension 22, that is, on the sidewall facing other finger extensions 22. Finger extension 22, together with pin extension 23 forms a male member 13 of a width only slightly less than the width of the male receiving recess 21 of the female portion 12. The transverse pin extensions 23 are of a diameter only slightly less than the width of the slotted recess 20 of tongue member 19. Each male portion 13 is spaced and adapted so as to be releasably interconnected within the male receiving recess 21 of an oppositely placed female portion 12 of an identical link member.

Body portion 11 is slotted between each female member 12 extending therefrom to provide a downwardly, rearwardly sloped, varying depth slotted curved keyway 24 recessed into the molded body portion 11 of link member 10 and said slotted keyway 24 is curved and centrally located in male receiving recess 21 so that it is adapted to receive the curved terminal portion of finger extension 22 of a male member 13 of an oppositely placed identical link member in a manner such that disengagement of a male portion 13 from a correspondingly placed and engageable female portion 12 is prevented while permitting partial rotating relationship of adjoining link member 10 when in normal operating condition as shown in FIG. 6.

Tongue member 19 of female portion 12 is beveled upwardly and rearwardly towards said wall 18 of body portion 11 as it merges into wall 18 in order to prevent binding during rotation of male member 13 when in operating relationship in male receiving recess 21. In a preferred form, slotted recess 20 in said female portion 12 is sloped downwardly and forwardly from the body portion 11 in a manner such that the longitudinal axis of the slotted recess 20 is nearer the body portion 11 of the top of the female portion 12 than the longitudinal axis of the recess is to the body portion 11 at the bottom of the recess 20. The angle of inclination of the recess 20 may be any suitable angle, preferably about 5° to 20° from the perpendicular so as to further prevent disengagement of adjacent link members while in operation. While this represents a preferred embodiment, it is to be realized that it is also possible to employ a slotted recess that has its longitudinal axis substantially parallel to the forward wall 18 of body portion 11.

In FIG. 2 there is illustrated another embodiment of the invention wherein a one-piece molded plastic link member 10 having a plurality of female members 12 and a plurality of male members 13 as would generally be provided in those cases where a wide link member is required such as in an endless tracked vehicle such as a snowmobile. In this embodiment the male members 13 and the female members 12 are identical to those described in FIG. 1, however, it will be readily apparent that each section of body portion 11 will not be required to be adapted to receive the teeth of a driving means. Thus, in such an embodiment only certain portions of the body section 11 will be required to be adapted to engage the teeth of a driving means. In the embodiment illustrated the link member is illustrated to be suitable for employment on two-sprocket drive and thus only body portions 11a and 11b are required to be adapted to receive the teeth of a driving means. The body portions not required to engage the sprocket teeth need not be of as thick a construction as the walls of the body portions that will be adapted to engage the sprocket teeth as illustrated by the varying width of the wall sections shown in the embodiment illustrated in FIG. 2. In this embodiment it is preferred that the body portions 11a and 11b which are to engage the drive means have no female members 12 or male finger extensions 22 projecting from the forward and rearward sides of the body sections. This arrangement permits a more satisfactory entrance and exit of the teeth of a driving means into the recess 14 of the body portions. Satisfactory coupling of one link member to an adjoining link member will be provided by the male and female members on the remaining body sections of the link member. If desired, the teeth engaging body portions 11a and 11b may be provided with transverse pins 23 on the sides of the body portion at the rearward portion of the body members. Moreover, the body sections which need not be adapted to receive teeth of a drive means may be provided with a bottom cover 50 extending from side to side of walls 15, 16, 17 and 18 thereby providing a flat bottom surface area for the link member.

Each link member together with other identical link members may be assembled into an endless chain in the manner as illustrated in FIGS. 3, 4 and 5. A link member 20 is placed with the female members 12 facing forward and the male members facing rearwardly. A second identical link member 10 is disposed at approximately a right-angle above the first link member with said second link member being positioned so that the male portions 13 thereof are downwardly directed and substantially perpendicularly aligned with the correspondingly placed male receiving recess 21 of the first link member. When the link members 10 are in such a position as shown in FIG. 3 the second link member is directed downwardly toward the first link member such that pins 23 of male portions 13 of the second link members are directed into the correspondingly placed slotted recesses 20 of female portions 12 of the first link member such that the male portion 13 with finger extensions 23 is placed into male receiving recess 21 as shown in FIG. 4. Thereupon, the second link member is rotated clockwise approximately 90° about pins 23 as shown in FIG. 4 thereby positioning the male portion 13 of the second link member into cooperating relationship with the male receiving recess of the first link member. In such a position the adjacent links will be in a substantially straight line as shown in FIG. 5. It will now be apparent that identical link members can be continuously engaged until an endless chain of suitable size can be obtained by engaging the male members of the first link unit with the female members of the link member last added to the chain assembly. It would be readily apparent that disassembly of adjacent links will be readily accomplished by a reversal of the above-described procedure. Such reversal of procedure, however, does not occur in the normal operation of such an endless chain and thus unintentional disengagement of adjacent link members is prevented.

Such an endless chain is suitable for use on a driving means such as a sprocket wheel. In such an embodiment as shown in FIG. 6 a plurality of link members connected in an endless chain is shown traversing a sprocket wheel 60 of a driving means 61 connected to a driving source of any conventional construction (not shown). The construction of the link members of this invention permits the assembled link members to transverse the sprocket wheels in cooperative relationship by a downward and clockwise rotation of a male portion 13 within the male receiving recess 21 of an adjacent, adjoining and following link member. In operation, disengagement of the link members is presented since an upward counterclockwise rotation is necessary and this movement is not possible when the endless chain of link members is assembled in cooperative relationship around the sprocket wheel.

The endless chain of link members made possible by this invention are particularly suitable for use as endless chains on tracked vehicles such as, for example, on snowmobiles and the like. When the one-piece molded plastic link members of this invention are employed in an endless chain for use on a snowmobile it is necessary that a molded plastic link member be constructed of an abrasion-resistant thermoplastic having sufficient stiffness so as to prevent substantial deformation of the link members during operation. In this regard it has been found that link members molded of a thermoplastic polyester based polyurethane elastomer such as a Texin elastomer sold by Mobay Chemical Company is especially suitable for use in producing link members suitable for snowmobile tracks. A most preferred type of link member is one molded of a glass-reinforced polyurethane such as that sold under the name Thermocomp by Liquid Nitrogen Processing Corporation of Malvern, Pa. Suitable elastomeric polyurethanes are, for example, disclosed in U.S. Pat. Nos. 3,214,411 and 2,729,618. It is to be recognized, however, that although a molded link member of polyurethane represents a preferred embodiment of the invention it is also possible to employ other suitable thermoplastic molding materials such as, for example, polycarbonates, polyurethane-polycarbonate blends and the like. Furthermore, in those applications which are less strenuous on the endless chains the link members need not be molded of such particular materials but may be molded of any suitable thermoplastic of sufficient stiffness so as to prevent any substantial deformation of the link members during operation.

In FIG. 7 there is illustrated an endless chain of link members of this invention in the preferred embodiment wherein the endless chain is employed as a track on a tracked vehicle such as a snowmobile. A snowmobile 70 of conventional construction, having a conventional power source (not shown) and driving means comprising sprocket wheels 71 and sprocket teeth 72 and bogie wheels 73 is equipped with an endless chain 80 of adjoining link members 10 of this invention. The endless chain track 80 of the invention is particularly suitable for use on snowmobiles or the like where the ease of replacement of damaged link members and the ease of assembly of endless chains of any desired length is particularly desirable. Furthermore, the endless chains have good relative strength per unit of weight thereby permitting more efficient operation of the snowmobile. The novel construction of the link members of this invention prevents unintentional disengagement of the link members during operation while permitting easy disassembly and replacement of individual links upon ceasing of operation.

While there has been described herein a linked member and endless chain therefrom adapted particularly for use with tracked vehicles it is also to be noted that the linked members may be employed to form endless chains adapted for use in any of the heretofore known operations requiring endless tracks.

It is to be understood that many substitutions or changes in the components and conditions mentioned as suitable herein can be made for its counterpart and that although the invention has been described in considerable detail in the foregoing, such detail is solely for the purpose of illustration. Variations can be made in the invention by those skilled in the art without departing from the spirit and scope of the invention.

What is claimed is:

1. A one-piece molded plastic link member adapted for coupling with an identical link member without distortion of either member which comprises a one-piece body portion having a recessed opening defined by integral walls and adapted to receive the teeth of a driving means said body portion having a female portion extending from one end thereof and a male portion extending from the opposite end thereof said female portion having a male receiving recess defined by adjacent and spaced-apart slotted tongue members extending from the one end of the body portion said male receiving recess being sloped downwardly and forwardly from the body portion such that its longitudinal axis is nearer the body portion of the top of the female portion than its longitudinal axis is to the body portion at the bottom of the male receiving recess, the angle of inclination of the male receiving recess being about 5° to about 20° from the perpendicular and having a centrally located varying depth slotted keyway recessed into the one end of the body portion, said male portion having an integral finger extension extending from the opposite end of the body portion, said finger extension having on the sidewalls thereof transverse pin extensions, which together with the finger extension forms a male member only slightly less than the width of the male receiving recess of said female portion, the female portion of the link member receiving the male portion of another identical link member by axially aligning the male portion of said other link member with the female portion of the one link member such that the slotted keyway receives the finger extension of the male member in a manner such that disengagement of a male portion from a female portion is prevented while permitting partial rotating relationship of adjoining link members when in normal operating relationship.

2. The link member of claim 22 wherein the one-piece body portion has a plurality of female portions extending from one end of the body portion and a corresponding plurality of male portions extending from the opposite end of the body portion and wherein each male portion is spaced and adapted so as to be releasably interconnected within the male receiving recess of an oppositely placed female portion of an identical link member.

3. The one-piece molded plastic link member of claim 1 wherein the link member is a molded thermoplastic or molded glass-reinforced thermoplastic polyurethane link member.

4. An endless chain comprising releasably interconnected adjoining link member of claim 1.

5. In a tracked vehicle driven by the action of an endless track around a sprocket wheel, the improvement comprising employing as the endless track the endless chain of claim 4.

6. The tracked vehicle of claim 5 wherein said tracked vehicle is a snowmobile.

* * * * *